United States Patent
Hirota et al.

(10) Patent No.: US 10,704,612 B2
(45) Date of Patent: Jul. 7, 2020

(54) CAM MECHANISM AND CLUTCH DEVICE WITH THE SAME

(71) Applicant: GKN Driveline Japan Ltd, Tochigi, Tochigi (JP)

(72) Inventors: Isao Hirota, Tochigi (JP); Manabu Endou, Tochigi (JP); Atsushi Maruyama, Tochigi (JP)

(73) Assignee: GKN Automotive Ltd., Birmingham, West Midlands (GB)

( * ) Notice: Subject to any disclaimer, the term of this patent is extended or adjusted under 35 U.S.C. 154(b) by 219 days.

(21) Appl. No.: 15/950,237

(22) Filed: Apr. 11, 2018

(65) Prior Publication Data

US 2018/0231069 A1    Aug. 16, 2018

Related U.S. Application Data

(63) Continuation of application No. PCT/JP2016/080462, filed on Oct. 14, 2016.

(30) Foreign Application Priority Data

Mar. 4, 2016  (JP) .................................. 2016-041787
Aug. 12, 2016 (JP) .................................. 2016-158619

(51) Int. Cl.
*F16D 23/12*  (2006.01)
*F16H 53/00*  (2006.01)
(Continued)

(52) U.S. Cl.
CPC ............ *F16D 23/12* (2013.01); *F16D 27/115* (2013.01); *F16H 53/00* (2013.01); *F16D 2023/123* (2013.01); *F16H 25/125* (2013.01)

(58) Field of Classification Search
None
See application file for complete search history.

(56) References Cited

U.S. PATENT DOCUMENTS 3,964,806 A * 6/1976 Harrison ................. F16D 55/14
                                                    384/620
4,036,328 A * 7/1977 Hoffman ................... B62L 1/00
                                                    188/26
(Continued)

FOREIGN PATENT DOCUMENTS

JP    S59124436 A    7/1984
JP    H02-60525 B2   12/1990
(Continued)

OTHER PUBLICATIONS

International Search Report and Written Opinion for PCT/JP2016/080462 dated Dec. 27, 2016 (with English translation; 11 pages).
(Continued)

*Primary Examiner* — Mark A Manley
(74) *Attorney, Agent, or Firm* — Bejin Bieneman PLC

(57) ABSTRACT

A cam mechanism used is provided with: a cam ring forming a circle around an axis and including a plurality of cam faces arranged circumferentially on a face of the circle facing in an axial direction, each of the cam faces sloping in a circumferential direction relative to a circumferential face perpendicular to the axis; a pressure ring adjacent axially to the face of the cam ring and including a plurality of cam faces opposed to the face of the cam ring and respectively symmetrical to the plurality of cam faces of the cam ring, the pressure ring being rotatable relatively to the cam ring about the axis; and a plurality of taper rollers interposed between the cam ring and the pressure ring, each of the taper rollers including a conical face tapering radially inwardly and capable of rolling on the cam faces.

8 Claims, 13 Drawing Sheets

(51) Int. Cl.
*F16D 27/115* (2006.01)
*F16H 25/12* (2006.01)
*F16H 25/18* (2006.01)

(56) References Cited

U.S. PATENT DOCUMENTS

| | | | | |
|---|---|---|---|---|
| 4,169,523 A | * | 10/1979 | Malinowski | F16D 55/14 188/106 F |
| 4,860,605 A | * | 8/1989 | Olschewski | F16H 25/186 74/99 R |
| 2006/0291966 A1 | * | 12/2006 | Klemm | F16D 7/08 408/124 |
| 2007/0234845 A1 | * | 10/2007 | Gist, Jr. | B62D 1/184 74/569 |
| 2010/0219034 A1 | * | 9/2010 | Wheals | F16D 21/06 192/48.1 |
| 2010/0227749 A1 | * | 9/2010 | Uranishi | F16C 19/381 492/1 |

FOREIGN PATENT DOCUMENTS

| | | |
|---|---|---|
| JP | H07-91514 A | 4/1995 |
| JP | 2001-41230 A | 2/2001 |
| JP | 2005-201288 A | 7/2005 |

OTHER PUBLICATIONS

Supplementary European Search Report for EP16892665.7 dated Sep. 23, 2019 (6 pages).

\* cited by examiner

CAM MECHANISM AND CLUTCH DEVICE WITH THE SAME

CROSS-REFERENCE TO RELATED APPLICATIONS

This application is a continuation Application of PCT International Application No. PCT/JP2016/080462 (filed Oct. 14, 2016), which is in turn based upon and claims the benefit of priority from Japanese Patent Application No. 2016-041787 (filed Mar. 4, 2016) and Japanese Patent Application No. 2016-158619 (filed Aug. 12, 2016), the entire contents of each of which are incorporated herein by reference.

BACKGROUND

A vehicle in general utilizes clutches. For example, in order to switch between a two-wheel-drive (2WD) mode and a four-wheel-drive (4WD) mode, there may be a case where a clutch is interposed between two shafts and an actuator controls its connection-disconnection. As it is difficult to create sufficient thrust force by a single means, a cam mechanism may be combined therewith so as to multiply its output force.

For the purpose of realizing smooth operation of the cam mechanism, balls may be interposed between cam members. As the balls roll on cam faces that relatively rotates, the balls prominently reduce friction resistance. This reduces load on the actuator, but, since the balls merely establish point contacts on the cam faces, it is problematic to impose a great thrust force on the cam mechanism. Use of rollers in place of the balls may be a solution for this problem because the rollers can establish line contacts. Japanese Patent Application Laid-open No. 2005-201288 discloses a related art.

SUMMARY

The disclosure herein relates to a cam mechanism applicable to a vehicle and a clutch device with the same. Studies carried out by the present inventors have demonstrated that the structure disclosed in Japanese Patent Application Laid-open No. 2005-201288 may have advantage to create great thrust force but also increases a load on the actuator. Even though each roller can roll without friction on a particular point on a tangent directed in a radial direction, radially outwardly or inwardly than the point, the cam faces have different peripheral speeds relative to the roller and this inevitably creates friction between the cam faces and the roller. The present inventors have discovered that this friction creates prominent resistance or damages the cam faces and the roller when the cam device bears great thrust force.

Devices as described below have been created on the basis of the discovery of the source of the problem as described above and are intended to reduce frictional resistance while enjoying advantages of line contact to enable smooth operation.

According to a first aspect, a cam mechanism is provided with: a cam ring forming a circle around an axis and including a plurality of cam faces arranged circumferentially on a face of the circle facing in an axial direction, each of the cam faces sloping in a circumferential direction relative to a circumferential face perpendicular to the axis; a pressure ring adjacent axially to the face of the cam ring and including a plurality of cam faces opposed to the face of the cam ring and respectively symmetrical to the plurality of cam faces of the cam ring, the pressure ring being rotatable relatively to the cam ring about the axis; and a plurality of taper rollers interposed between the cam ring and the pressure ring, each of the taper rollers including a conical face tapering radially inwardly and capable of rolling on the cam faces.

According to a second aspect, a clutch device is provided with: a first rotary member and a second rotary member respectively and independently rotatable about the axis; the cam mechanism of claim 1; an actuator drivingly coupled with the cam ring to rotate the cam ring; and a clutch adjacent to the pressure ring and receiving pressure force from the pressure ring to disconnectably connect (i.e., be capable of decoupling) so as to transmit torque between the first rotary member and the second rotary member.

DESCRIPTION OF EXEMPLARY EMBODIMENTS

Exemplary embodiments will be described hereinafter with reference to the appended drawings. Throughout the following description and the appended claims, an axis means a rotational axis of a rotary member and a radial direction means a direction perpendicular thereto. This rotational axis also coincides with a central axis of a cam mechanism.

Figure 1:
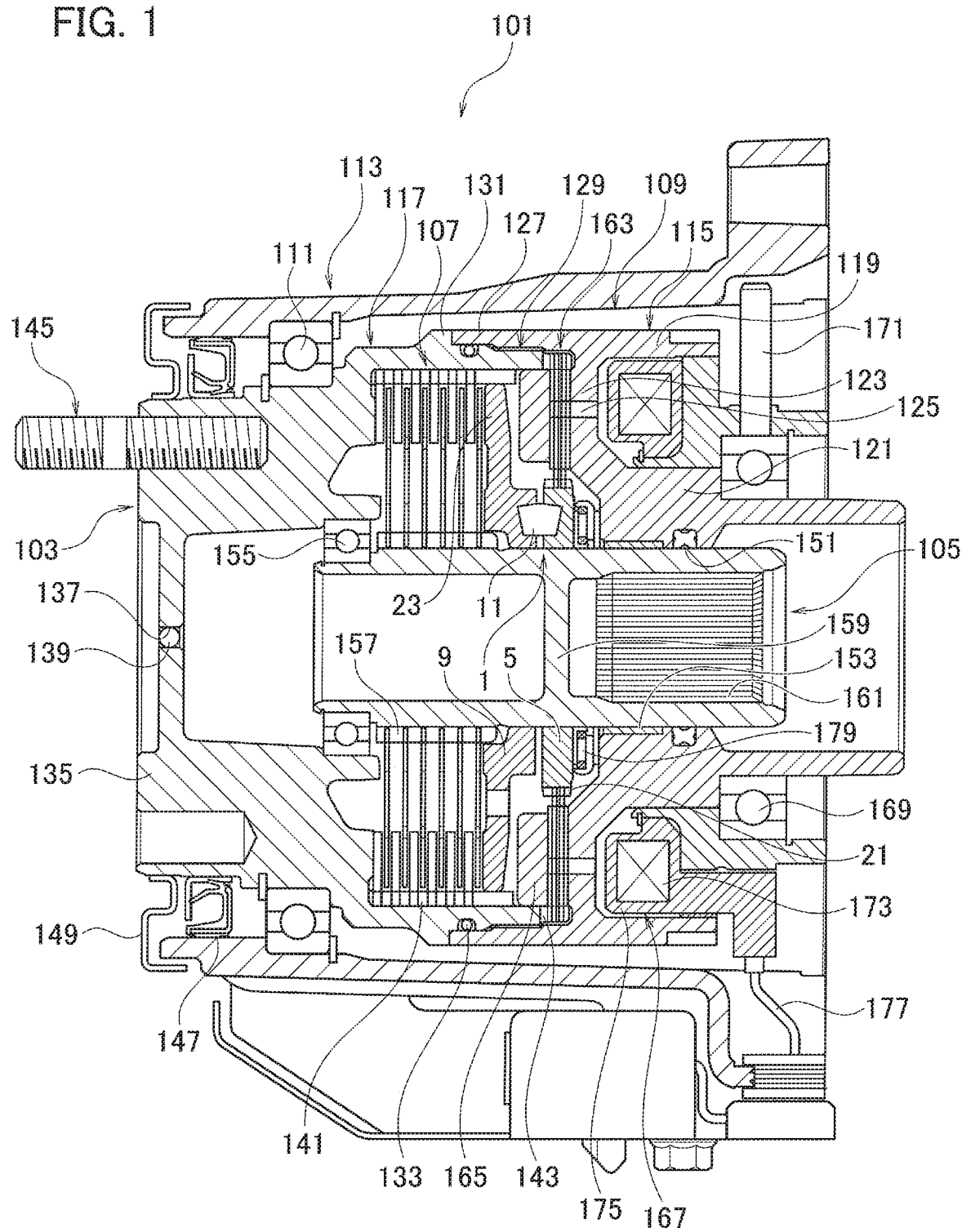
FIG. 1 is a sectional view of a clutch device according to a first embodiment.

Referring first to FIG. 1, a cam mechanism is used in combination with a clutch device and one example thereof is a multi-plate clutch. While the combination with the multi-plate clutch has the advantage to continuously and quantitatively control transmitting torque, it is not limited thereto but any proper type of clutches, such friction, spline, dog or synchro-cone clutches, can be combined therewith, for example.

A clutch device 101 according to the present embodiment is provided with an outer rotary member 103 and an inner rotary member 105, as a pair of rotary members, which are respectively and independently rotatable about an axis, an intermission section 107 interposed between the outer rotary member 103 and the inner rotary member 105, which axially moves to intermit power transmission between the outer rotary member 103 and the inner rotary member 105, an actuator 109 for operating the intermission section 107, and a cam mechanism 1 for manipulating the intermission section 107 by the operation of the actuator 109. Meanwhile, in any other type of clutches, the pair of rotary members is not limited to the arrangement where one is disposed inside and another outside. Further, it is not limited to a structure in which an independent intermission section is disposed therebetween, but has a structure in which the rotary members respectively function as clutch plates as well. The actuator 109, as described below, drivingly connects with and thereby rotates a cam ring 5 relative to a pressure ring 9 to create a cam function, thereby connecting the clutch.

The outer rotary member 103 is, having a bearing 111 interposed, rotatably supported by a carrier 113 as a stationary member, and is constituted of a rotor 115 and a housing 117.

The rotor 115 is formed of a magnetic material, in which one-side elongating sections 119, 121 elongatedly installed at a side of an electromagnet 167 of the actuator 109 and a wall section 123 are so disposed as to enclose a periphery of the electromagnet 167, and the wall section 123 is disposed axially between the electromagnet 167 and a pilot clutch 163 of the actuator 109.

Further, on the wall section 123 unitarily provided is a member 125 of a non-magnetic material by means of a fixation means such as welding. Specifically, as the member 125 of the non-magnetic material intervenes in the wall section 123, a magnetic flux is diverted from the member 125 and then conducted to an armature 165 as described later. A core 175, the elongating sections 119, 121, the wall section 123, and the armature 165 constitute a magnetic path forming a closed magnetic loop. When the electromagnet 167 is energized, the magnetic flux attracts the armature 165 toward the wall section 123.

An air gap is provided in the rotor 115 opposed to, and intervening radially therebetween, the core 175 of the electromagnet 167, thereby enabling transfer of the magnetic flux from the core 175 of the electromagnet 167 to the rotor 115.

A side of the rotor 115 facing to the pilot clutch 163 forms another-side elongating section 127 axially elongatedly installed, and at inner periphery of the another-side elongating section 127 provided is a connection section 129 with a spline shape.

To this connection section 129, the housing 117 is connected in such a way as to be unitarily rotatable. Further, a projecting section 131 provided on the housing 117 abuts on its end section so that the axial position of the rotor 115 is put in place and is fixed with the housing 117 by means of a fixation means such as welding so as to be unitarily rotatable.

The housing 117 is formed of a non-magnetic material and formed in a bottomed tubular shape. In radially between the housing 117 and the rotor 115, a seal member 133 for defining the interior of the outer rotary member 103 relative to the exterior is provided.

Meanwhile, on a bottom wall section 135 of the housing 117 provided is an injection hole 137 through which lubricant oil is made to flow in the outer rotary member 103, and it is closed by a lid member 139 after the lubricant oil is made to flow therein.

On the tubular inner periphery of the housing 117, an engaging section 141 of a spline shape is formed and outer clutch plates of the intermission section 107 are engaged therewith.

Further, at the end section of the housing 117, which is axially adjacent to the engaging section 141, an engaging section 143 is formed installed elongatedly toward the side of the rotor 115 in the axial direction and having a shape being concavo-convex in the circumferential direction, and outer plates of the pilot clutch 163 are engaged with its concave sections.

This engaging section 143 is disposed at the inner periphery of the other-side elongating section 127 of the rotor 115, and the engaging section 143 of a non-magnetic material is disposed to establish a structure through which the magnetic flux is hard to permeate.

On a bottom wall section 135 of such a housing 117, connection members 145 such as stud bolts are fixed, and, via these connection members 145, a rotary member as one of input and output members (not shown), for example, is connected in such a way as to be unitarily rotatable with the outer rotary member 103.

Meanwhile, in between the outer rotary member 103 and the carrier 113, a seal member 147 to define the interior and the exterior of the carrier 113 is disposed, and also a dust cover 149 to cover the periphery of the seal member 147 is disposed.

At a rotational axial center of the outer rotary member 103, the inner rotary member 105 is disposed in such a way as to be rotatable relative to the outer rotary member 103.

The inner rotary member 105 is formed to be hollow and is rotatably supported by the outer rotary member 103 via an X-ring 151, a sliding bush 153 and a bearing 155 around its outer periphery.

Meanwhile, the X-ring 151 functions as a sealing means for defining the interior of the outer rotary member 103 relative to the exterior after sealing the lubricant oil therein.

On the outer periphery of the inner rotary member 105, an engaging section 157 of a spline shape is formed, and inner clutch plates of the intermission section 107 and the pressure ring 9 of the cam mechanism 1 are engaged therewith.

Further, at a central section at the axial center side of the inner rotary member 105, a partition wall 159 is provided as a unitary member continuous to the inner rotary member 105 and divides the interior from the exterior of the outer rotary member 103.

On the inner periphery of such an inner rotary member 105, a connection section 161 of a spline shape is formed, and a rotary member as another of input and output members (not shown), for example, is connected in such a way as to be unitarily rotatable with the inner rotary member 105.

Driving torque transmitted between the inner rotary member 105 and the outer rotary member 103 is intermitted/transmitted by the intermission section 107.

The intermission section 107 is disposed within the outer rotary member 103 and is provided with a plurality of outer clutch plates and a plurality of inner clutch plates.

The plurality of outer clutch plates is engaged with the engaging section 141 formed on the internal periphery of the housing 117 in such a way as to be axially movable and unitarily rotatable with the outer rotary member 103.

The plurality of inner clutch plates are arranged axially alternately with the plurality of outer clutch plates. The plurality of inner clutch plates is engaged with the engaging section 157 formed on the outer periphery of the inner rotary member 105 in such a way as to be axially movable and unitarily rotatable with the inner rotary member 105.

This intermission section 107 is a multi-plate clutch constituted of the plurality of outer clutch plates and the plurality of inner clutch plates, and forms a friction clutch of a control type that is midway controllable of transmitted torque with slip friction.

Such an intermission section 107 is connected and disconnected by actions of the actuator 109 and thereby intermissively transmits the driving torque transmitted between the outer rotary member 103 and the inner rotary member 105.

The actuator 109 is constituted of a pilot clutch 163, an armature 165, an electromagnet 167 and such.

The pilot clutch 163 is disposed axially between the rotor 115 and the armature 165 within the outer rotary member 103.

This pilot clutch 163 is constituted of outer plates coupled with the engaging section 143 of the housing 117 in such a way as to be axially movable and unitarily rotatable with the outer rotary member 103, and inner plates coupled with the outer periphery of the cam ring 5 of the cam mechanism 1 in such a way as to be arranged axially alternately with the plurality of outer plates and unitarily rotatable with the cam ring 5.

Such a pilot clutch 163 is connected as the armature 165 is attracted and moved by energization of the electromagnet 167.

The armature 165 is formed of a magnetic material and formed into a circular shape, is disposed opposed to the rotor 115 with having the pilot clutch 163 axially interposed, and is disposed within the outer rotary member 103 in such a way as to be axially movable.

This armature 165 is attracted and moved toward the rotor 115 by means of a magnetic flux loop formed when the electromagnet 167 is energized, and connects the pilot clutch 163.

The electromagnet 167 is disposed inside the rotor 115 and outside the outer rotary member 103 with a bearing 169 interposed, and is as well anti-rotated relative to the carrier 113 by means of an anti-rotation member 171, and is provided with an electromagnet coil 173 and a core 175.

The electromagnet coil 173 is wound in a predetermined number of turns in a circular shape and molded in a resin. Further, a lead line 177 is connected to the electromagnet coil 173 and led to a controller (not shown) that controls energization via the lead line 177. The core 175 is disposed around the electromagnet coil 173.

The core 175 is formed of a magnetic material so as to form a magnetic field by energization of the electromagnet coil 173, has a predetermined magnetic path cross-sectional area, is disposed radially between the electromagnet coil 173 and the rotor 115, and, along with the rotor 115, makes the magnetic flux permeate therethrough to form the magnetic flux loop.

In this electromagnet 167, the electromagnet coil 173 is so energized under control by the controller as to create required frictional torque in the intermission section 107, and the pilot clutch 163 thereby is connected to create the thrust force in the cam mechanism 1.

The cam mechanism 1 is constituted of the cam ring 5, the pressure ring 9 and cam members 11. The cam mechanism 1 is adjacent to the clutch device 101, and in particular the pressure ring 9 is adjacent to the intermission section 107, thereby the pressure ring 9 is capable of exerting pressure force on the intermission section 107 to connect the clutch.

The cam ring 5 disposed on the outer periphery of the inner rotary member 105 in such a way as to be axially movable, and, on an engaging section 21 of a serrated shape formed on the outer periphery of the cam ring 5, the plurality of inner plates of the pilot clutch 163 is connected in such a way as to be unitarily rotatable. Specifically, the cam ring 5 forms a circle around the axis.

Axially between this cam ring 5 and the rotor 115, a thrust bearing 179 is disposed, which receives thrust reaction force created in the cam mechanism 1.

Of such a cam ring 5, rotation is controlled by connection of the pilot clutch 163 and differential rotation is thereby created relative to the pressure ring 9.

The pressure ring 9 is so disposed on the engaging section 157 of the inner rotary member 105 as to be axially movable and unitarily rotatable with the inner rotary member 105, and is disposed axially adjacent to the intermission section 107 in such a way as to abut on the clutch plates of the intermission section 107.

This pressure ring 9 is axially moved in a direction of connection of the intermission section 107 by the thrust force created by the cam mechanism 1 to, by means of its circular pressure section 23 formed on its outer periphery, apply pressure force to the plurality of clutch plates of the intermission section 107, thereby connecting it.

On axially opposed faces of such a pressure ring 9 and such a cam ring 5, a plurality of cam faces 3, 7 (see FIG. 2 and FIG. 3) are respectively formed in circumferential directions and the plurality of cam members 11 is interposed between these cam faces 3, 7.

These cam members 11, when the differential rotation is created between the cam ring 5 and the pressure ring 9 by connection of the pilot clutch 163, generate a cam thrust force that axially presses and moves the pressure ring 9 toward the intermission section 107 in accordance with friction torque created in the pilot clutch 163.

In the clutch device 101 as so structured, by energization of the electromagnet 167, magnetic lines of flux through the core 175, the one-side elongating sections 119, 121 of the rotor 115, the wall section 123 and the armature 165 go round to form a magnetic flux loop, so that the armature 165 is attracted and moved toward the electromagnet 167 to connect the pilot clutch 163.

Connection torque by the pilot clutch 163 is converted into axial thrust force by the cam mechanism 1 so that the pressure section 23 of the pressure ring 9 presses the plurality of clutch plates of the intermission section 107 to connect the intermission section 107.

As the intermission section 107 gets connected, the outer rotary member 103 is connected with the inner rotary member 105 and thus, for example, transmission of driving torque between the input and output members are enabled.

Figure 2:
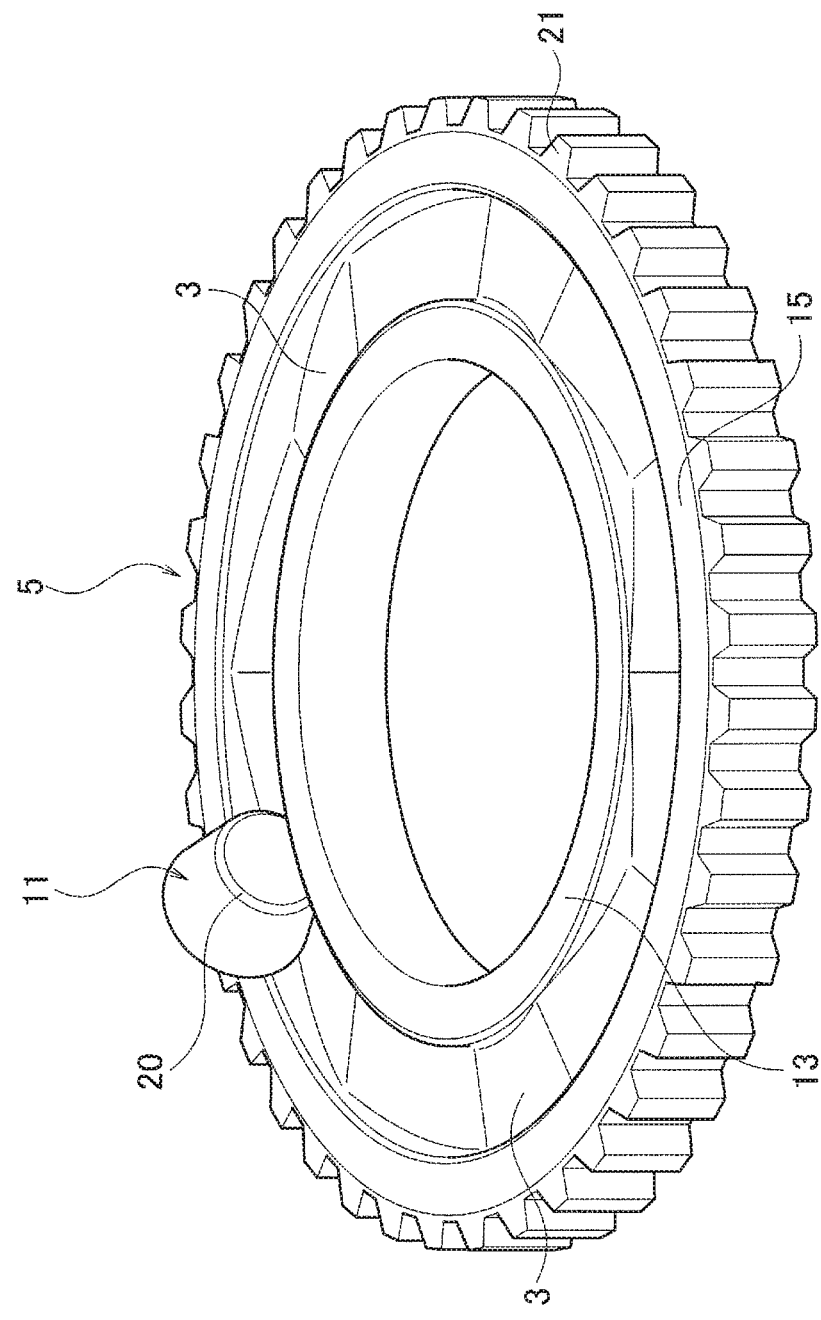
FIG. 2 is a perspective view of a cam ring and a cam member of a cam mechanism according to the first embodiment.
Figure 3:
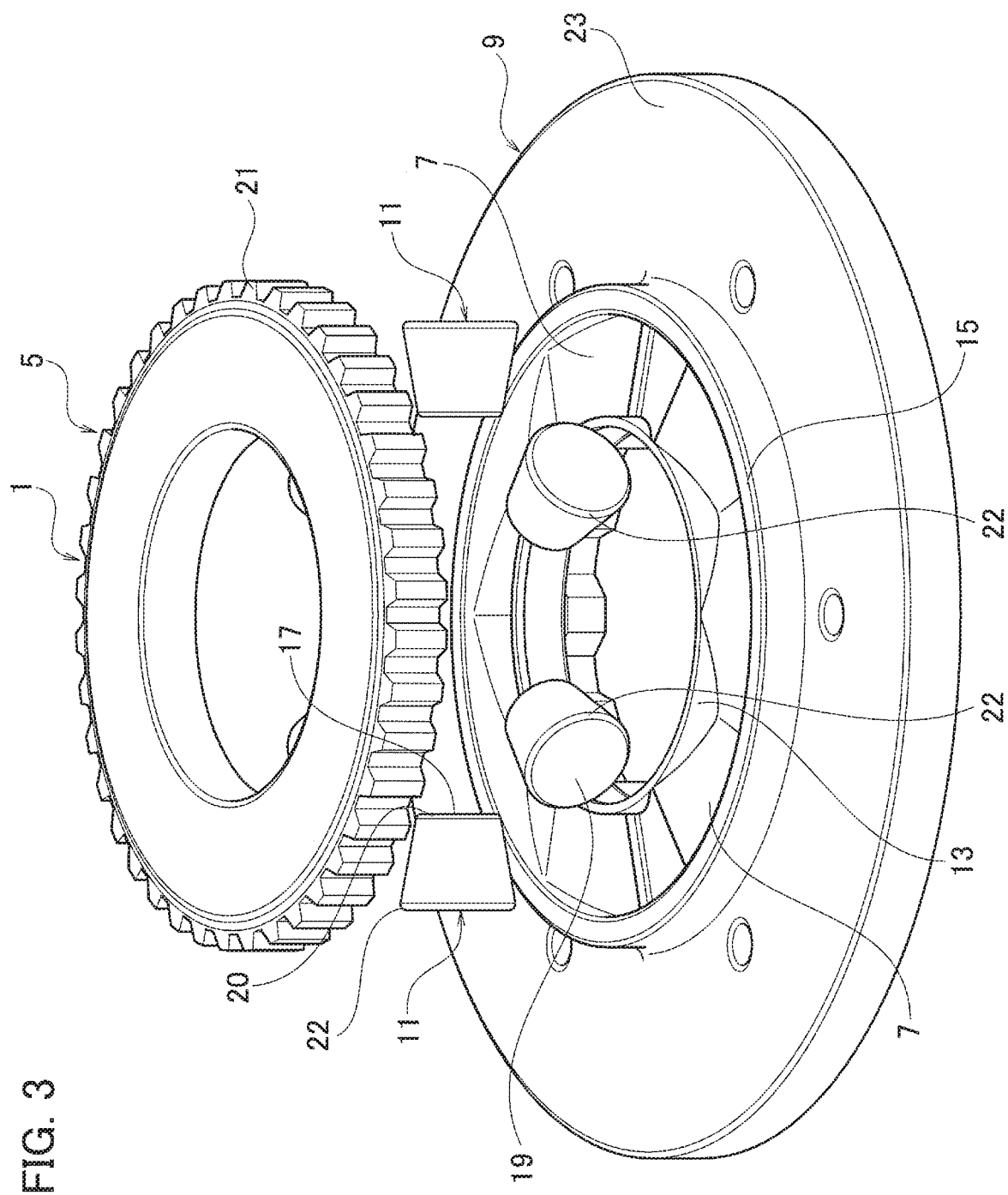
FIG. 3 is an exploded perspective view of the cam mechanism of the first embodiment.
Figure 4:
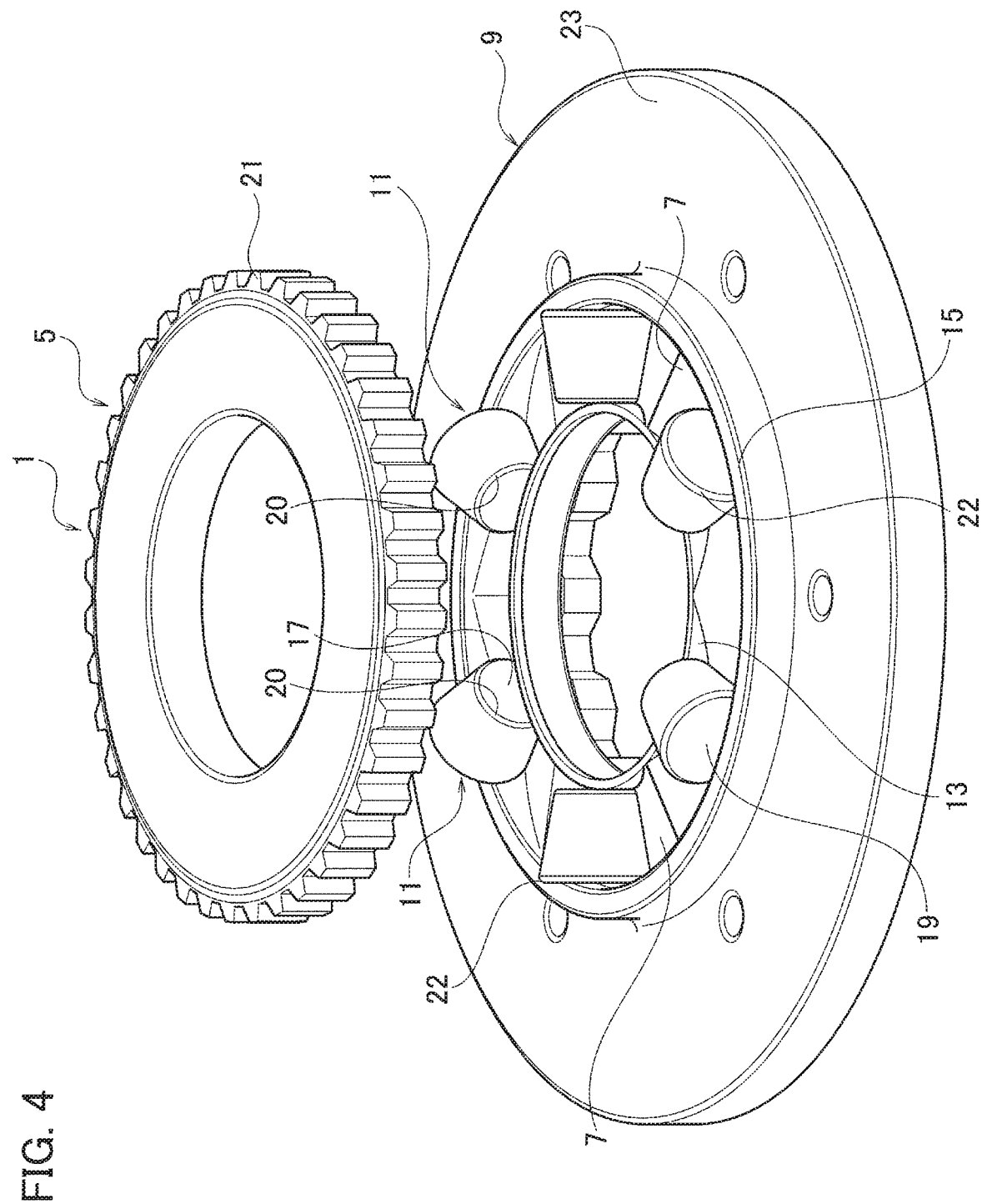
FIG. 4 is an exploded perspective view in which the cam member of the cam mechanism of the first embodiment is disposed on a pressure ring.

Referring to FIGS. 2 through 4 for example, the cam mechanism 1 according to the present embodiment is provided with the cam ring 5 with the plurality of cam faces formed circumferentially thereon, the pressure ring 9 axially movable and rotatable relative to the cam ring 5 and having the plurality of cam faces 7 formed circumferentially and opposed to the cam faces 3 on the cam ring 5, and the plurality of cam members 11 disposed between the cam faces 3, 7 of the cam ring 5 and the pressure ring 9 to make a circumferentially relative motion between the cam faces 3, 7 on the basis of a relative rotation of the cam ring 5 and the pressure ring 9 to axially move the pressure ring 9.

Further, the cam members 11 are taper rollers, each of which tapers radially inwardly, and the cam faces 3, 7 of the cam ring 5 and the pressure ring 9 are set to be slopes that make central positions at radially inner sides of the cam members 11 in the relative motion of the cam members 11 relative to the cam faces 3, 7 conform to central positions at radially outer sides of the cam members 11.

Further, on the cam ring 5 and the pressure ring 9 respectively, radially internal wall sections 13 that set a radially external bound to the cam members 11, and radially external wall sections 15 that set a radially internal bound to the cam members 11, are provided.

Moreover, the radially internal wall section 13 and the radially external wall section 15 have round-about shapes for simultaneously limiting the plurality of cam members 11.

Further, an inner end peripheral wall 17 and an outer end peripheral wall 19 of each cam member 11 are formed as curved faces 20, 22.

Moreover, the cam members 11 are formed of a material having a higher strength than the cam faces 3, 7.

Each cam member 11 is formed in a frusto-conical shape and is a taper roller tapering radially inwardly. Specifically, each cam member 11 is provided with a conical face tapering radially inwardly. This moderates difference in peripheral speeds relative to the respective cam faces 3, 7 and therefore reduces friction. Preferably, each taper roller is so dimensioned that generatrices of the conical face converge on the axis so as to minimize the difference in peripheral speeds, namely the friction. The plurality of cam members 11 is arranged between the cam faces 3, 7 formed on the axially opposed faces of the cam ring 5 and the pressure ring 9 and at even intervals in the circumferential direction of the cam ring 5 and the pressure ring 9.

The cam ring 5 and the pressure ring 9 make relative rotary motion as difference in rotation is created between the cam ring 5 and the pressure ring 9 by control of the rotation of the cam ring 5 by connection of the pilot clutch 163 as described above.

Then the cam members 11 as the taper rollers, by the relative rotation of the cam ring 5 and the pressure ring 9, roll on the cam faces 3, 7 and, as described later, move the pressure ring 9 in the axial direction.

The cam ring 5 generally forms a circle and the plurality of cam faces 3 are arranged circumferentially on one face of the circle facing in the axial direction.

Each cam face 3 of the cam ring 5 is constituted of two slopes that rise toward both sides in the circumferential direction at both sides in the moving directions of each cam member 11, these two slopes are in pair, and the plural pairs of slopes are formed so that peaks and troughs thereof are arranged in series at even intervals relative to the respective cam members 11. Specifically, each cam face 3 slopes in the circumferential direction relative to the circumferential face perpendicular to the axis.

Each cam face 3 of the cam ring 5 is so formed that two slopes are respectively oblique to spread from the radially inward side to the radially outward side, and keeps line contact with the conical face of each cam member 11 while the cam member 11 rolls thereon. Specifically, each cam face 3 is oblique not only in the circumferential direction but also in a direction where its face faces radially outwardly, thereby having line contact with the conical face of each cam member 11. This is also beneficial in keeping each cam member 11 in the radial direction. Preferably, each cam face 3 is a slope so dimensioned as to direct each cam member 11 in a direction where the generatrices of the conical face steadily cross the axis, and an example thereof is a helicoid. In this combination, each cam member 11 is prevented from being skewed relative to the radial direction and, as a difference in peripheral speeds does not occur, rolls on each cam face 3 without friction.

The cam faces 7 of the pressure ring 9 are disposed axially opposed to the cam faces 3 of the cam ring 5.

The pressure ring 9 also generally forms a circle and is provided with the plurality of cam faces 7 corresponding to the plurality of cam faces 3. Each cam face 7 of the pressure ring 9 has a slope angle and a shape identical to those of each cam face 3 of the cam ring 5, and is disposed opposed to and symmetrical to each cam face 3 of the cam ring 5 at an initial position where the difference in rotation between the cam ring 5 and the pressure ring 9 does not occur.

As the cam faces 3, 7 of the cam ring 5 and the pressure ring 9 are thus formed, in a movement of each cam member 11 in a circumferential direction of the cam faces 3, 7 of the cam member 11, a travel distance at the radially outer side of the cam member 11 can be made greater than a travel distance at the radially inner side of the cam member 11 so that variations of the rotational axial center of the cam member 11 in the circumferential direction of the cam ring 5 and the pressure ring 9 can be prevented.

Figure 5A:
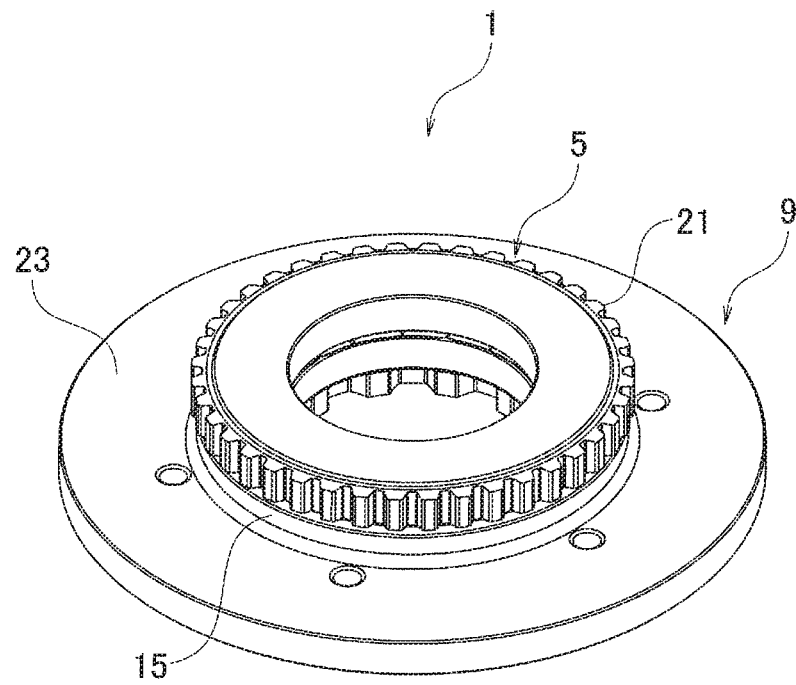
FIG. 5A is a perspective view in which the cam ring and the pressure ring of the cam mechanism of the first embodiment do not rotate relative to one another.
Figure 5B:
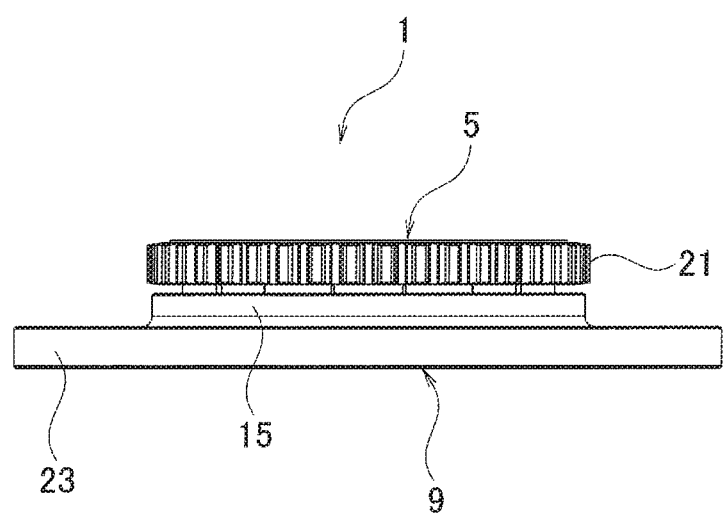
FIG. 5B is a side view of the cam ring and the pressure ring corresponding to FIG. 5A.
Figure 6A:
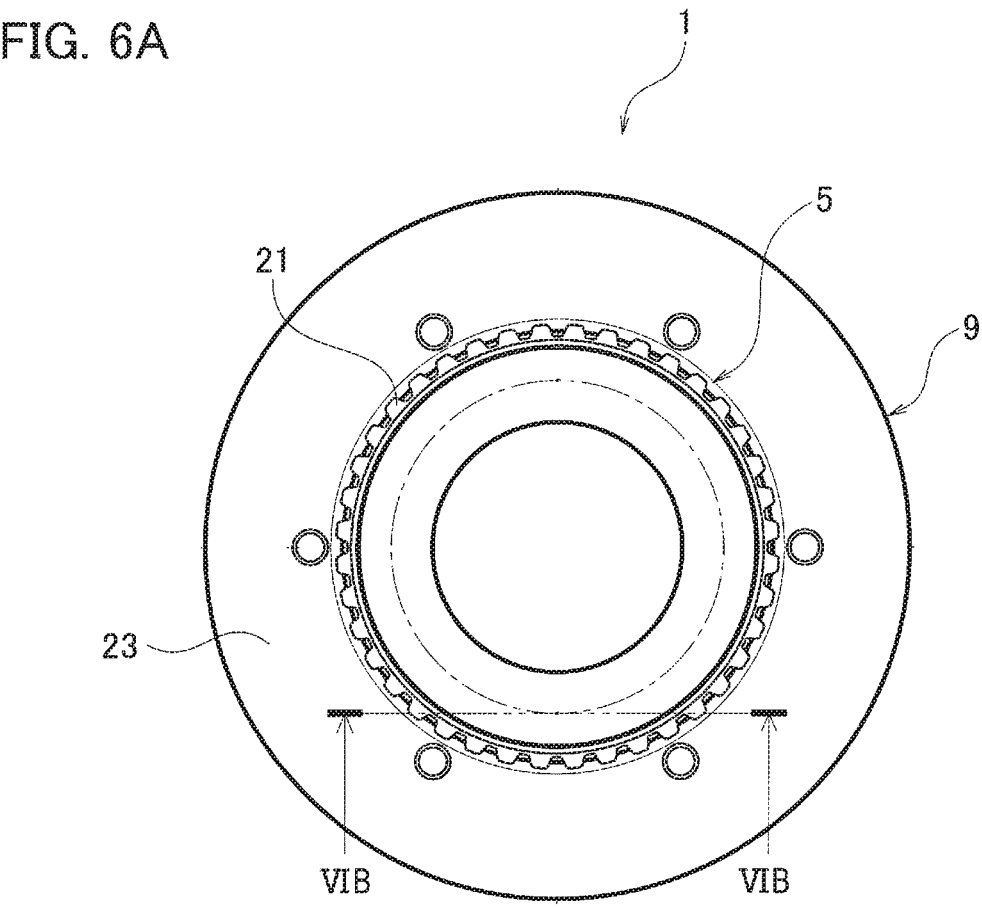
FIG. 6A is a plan view of the cam ring and the pressure ring corresponding to FIG. 5A.
Figure 6B:
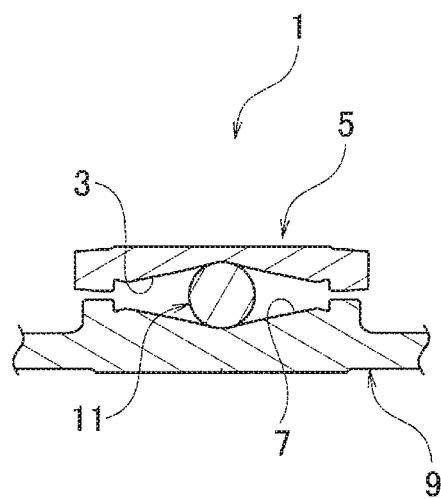
FIG. 6B is a sectional view taken from a line VIB-VIB of FIG. 6A.

In the initial position of the cam ring 5 and the pressure ring 9 as such, as shown in FIG. 4 and FIG. 6B, the cam members 11 formed of the plurality of taper rollers are disposed at trough sections between the cam faces 3, 7 and then the cam ring 5 and the pressure ring 9 rest on an axially closest state as shown in FIGS. 5A, 5B and 6A.

Figure 7A:
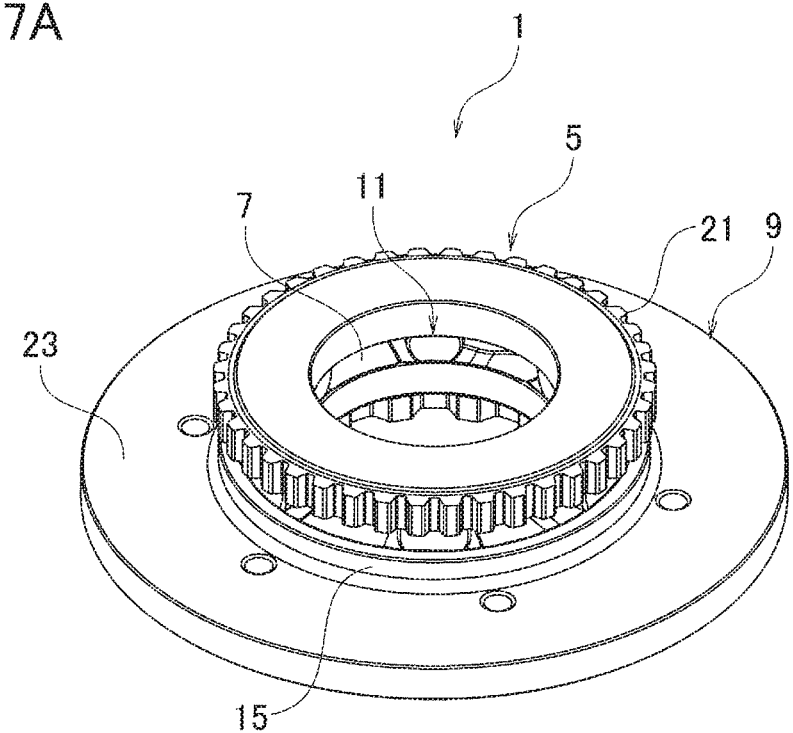
FIG. 7A is a perspective view in which the cam ring and the pressure ring of the cam mechanism of the first embodiment rotate relative to one another.
Figure 7B:
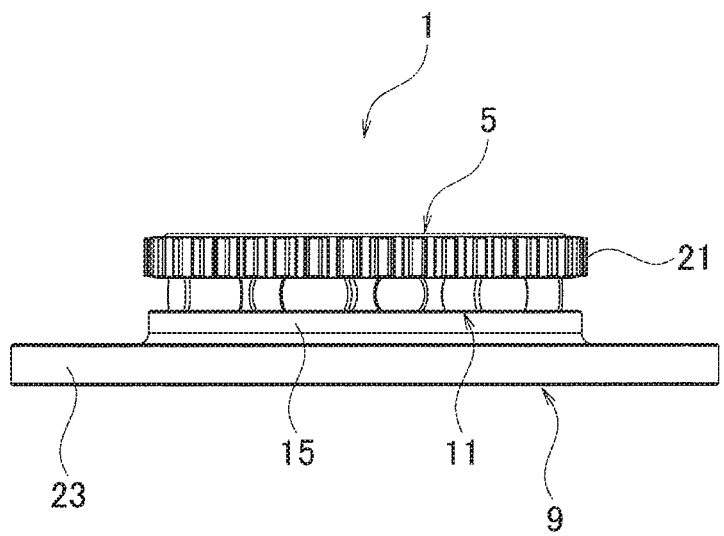
FIG. 7B is a side view of the cam ring and the pressure ring corresponding to FIG. 7A.
Figure 8A:
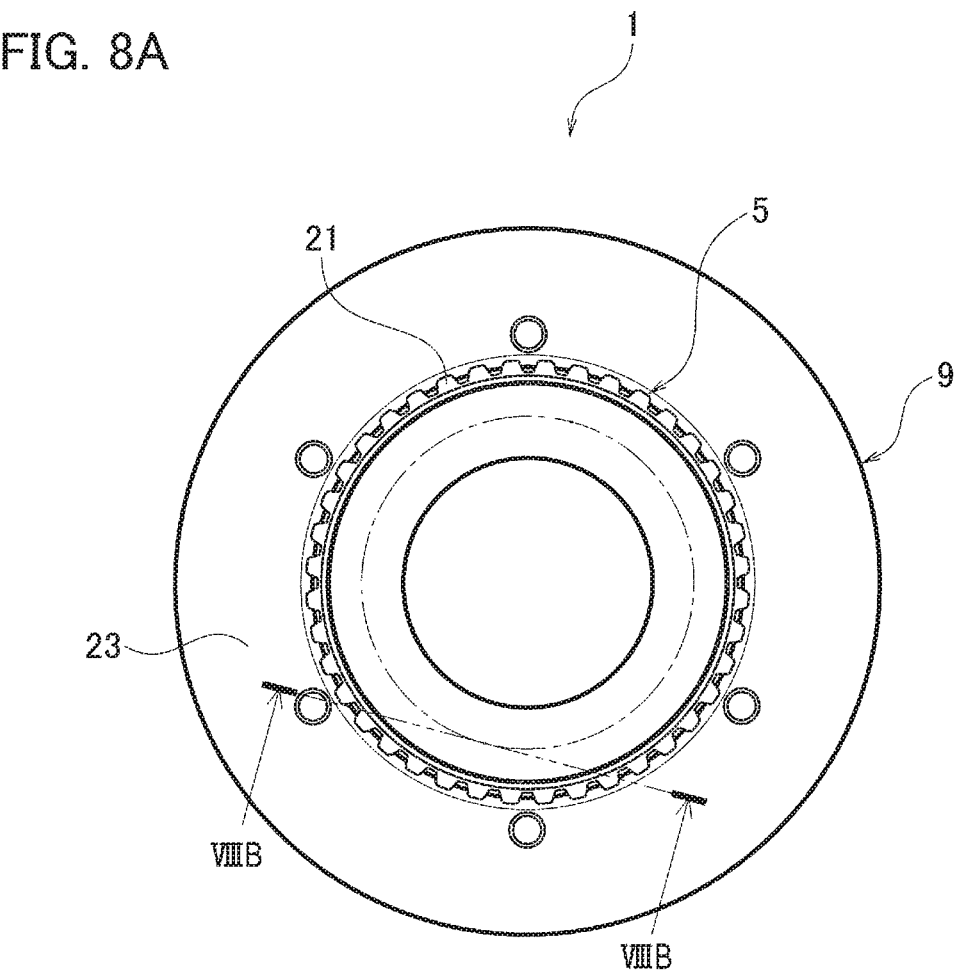
FIG. 8A is a plan view of the cam ring and the pressure ring corresponding to FIG. 7A.
Figure 8B:
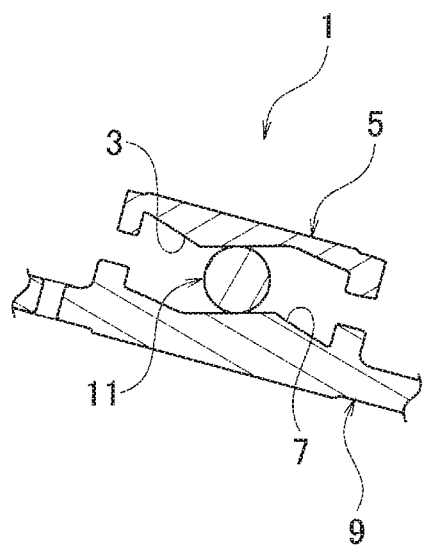
FIG. 8B is a sectional view taken from a line VIIIB-VIIIB of FIG. 8A.
Figure 9:
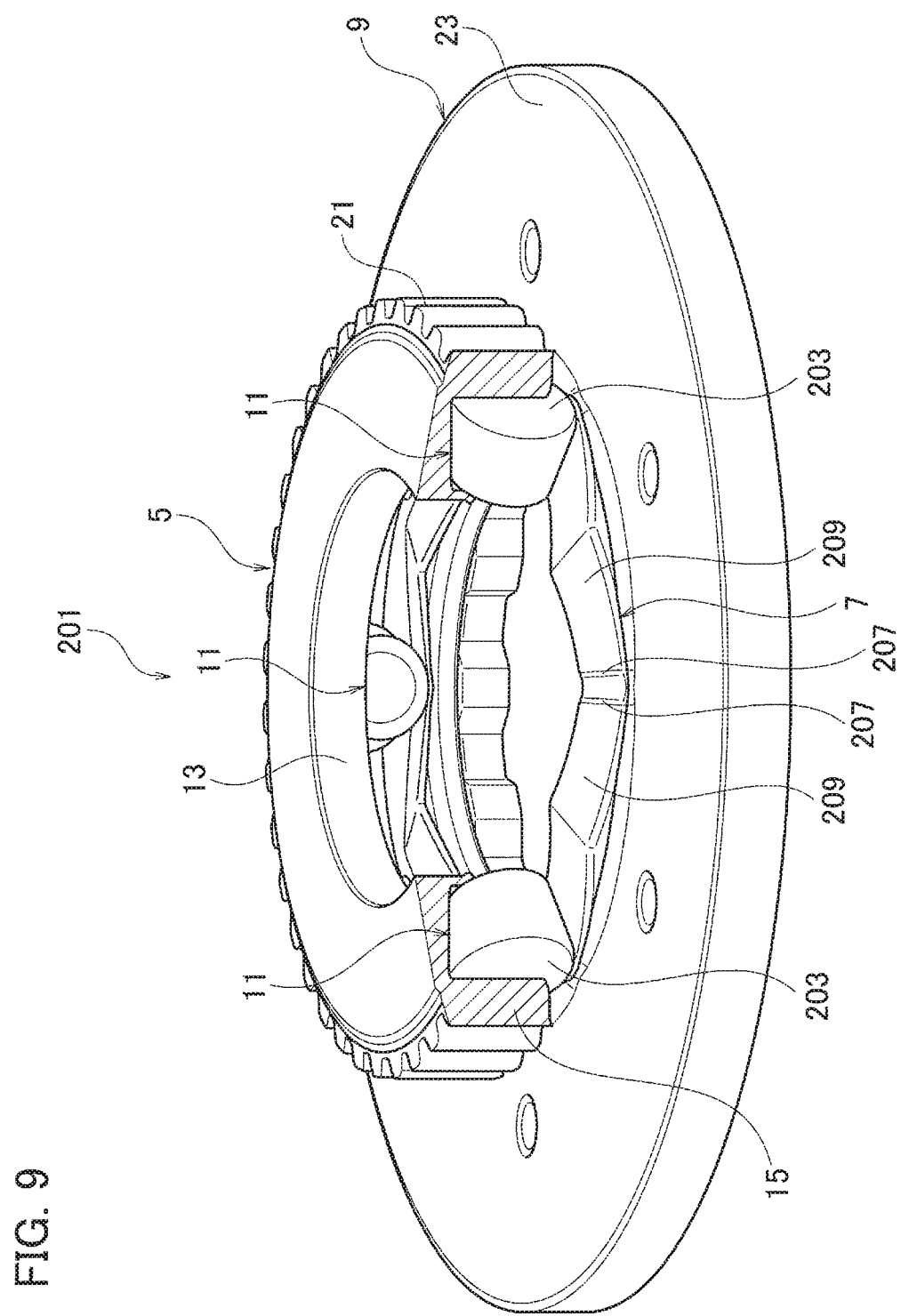
FIG. 9 is a perspective view of a cam mechanism according to a second embodiment.

From this state, when a difference in rotation between the cam ring 5 and the pressure ring 9 is generated, the plurality of cam members 11 respectively roll on the cam faces 3, 7 in the circumferential direction, as shown in FIG. 8B, to move the pressure ring 9 in the axial direction toward the intermission section 107 as shown in FIGS. 7A, 7B and 8A.

By this axial movement of the pressure ring 9, the pressure section 23 of the pressure ring 9 presses the plurality of clutch plates of the intermission section 107 to connect the intermission section 107.

In the movements of the cam members 11 in the circumferential direction of the cam faces 3, 7, as the cam members 11 are of the taper rollers and the cam faces 3, 7 are oblique to spread from the radially inward side to the radially outward side, even where the cam members 11 move in the cam faces 3, 7, the central positions in the radially inner sides of the cam members 11 can be made to conform to the central positions of the radially outer sides of the cam members 11.

Therefore the rotational axial centers of the cam members 11 in the movements of the cam members 11 in the circumferential direction of the cam faces 3, 7 can be prevented, and the cam members 11, particularly the radially outer sides of the cam members 11, do not make slippage in moving on the cam faces 3, 7.

Therefore, in the design of the movement stroke of the pressure ring 9 in the axial direction for example, any complex conditions such as the frictional resistance by the slippage of the cam members 11 on the cam faces 3, 7 are not required to be taken into consideration and thus accurate design can be carried out purely on the basis of settings about the cam members 11 and the cam faces 3, 7.

In particular, by improving accuracy of the design of the cam mechanism 1, settings of the connection torque of the pilot clutch 163 in the actuator 109 of the clutch device 101 or such can be readily changed, and properties of the intermission of the intermission section 107 in the clutch device 101 can be improved.

Here, on the cam ring 5 and the pressure ring 9, the radially internal wall sections 13 are disposed at radially inner sides of the cam faces 3, 7, and the radially external wall sections 15 are disposed at radially outer sides of the cam faces 3, 7.

In regard to these radially internal wall sections 13 and these radially external wall sections 15, in the movements of the cam members 11 in the circumferential direction of the cam faces 3, 7, the radially internal wall sections 13 set a radially internal bound to the cam members 11 and the radially external wall sections 15 set a radially external bound to the cam members 11.

The radially internal wall sections 13 and the radially external wall sections 15 as such are formed in similar shapes as opposed to each other on the respective opposed faces of the cam ring 5 and the pressure ring 9, thereby limiting movement of the plurality of cam members 11 radially inwardly and radially outwardly.

As the radially internal wall sections 13 and the radially external wall sections 15 are provided in this way, the cam members 11 can be stably moved in the circumferential direction of the cam faces 3, 7 and the axial movement of the pressure ring 9 can be stabilized.

In addition, the radially internal wall sections 13 and the radially external wall sections 15 form round-about shapes as being formed in a circumferentially continuous circular shape so as to simultaneously limit the plurality of cam members 11.

As the radially internal wall sections 13 and the radially external wall sections 15 are formed in the round-about shapes as described above, the movement of the plurality of cam members 11 in the circumferential direction of all the cam faces 3, 7 can be carried out stably and the axial movement of the pressure ring 9 can be stabilized as well.

Here, the radially internal wall sections 13 and the radially external wall sections 15 are so projectingly provided that these internal wall faces that abut on the cam members 11 stand on, and perpendicularly to, end faces of the cam ring 5 and the pressure ring 9.

As the internal wall faces of the radially internal wall sections 13 and the radially external wall sections 15 are provided vertically, when the internal wall faces of the radially internal wall sections 13 and the radially external wall sections 15 slide on the inner end peripheral walls 17 and the outer end peripheral walls 19 of the cam members 11, the radially internal sides and the radially outer sides of the cam members 11 are prevented from floating up along the internal wall faces, the movement of the cam members 11 in the circumferential direction of the cam faces 3, 7 can be stabilized.

The inner end peripheral wall 17 and the outer end peripheral wall 19 of each cam member 11, which slide on the internal walls of the radially internal wall sections 13 and the radially external wall sections 15, are formed as the curved faces 20, 22.

As the inner end peripheral wall 17 and the outer end peripheral wall 19 of each cam member 11 are formed as the curved faces 20, 22 in this way, the cam members 11 can smoothly move on the cam faces 3, 7 along the inner end peripheral wall 17 and the outer end peripheral wall 19.

In addition, the cam members 11 are formed of a material having higher strength than the cam faces 3, 7, namely the cam ring 5 and the pressure ring 9.

Here, as the cam members 11 are formed of the taper rollers, contacts between the cam members 11 and the cam faces 3, 7 are line contacts. Therefore contact pressure is reduced as compared with point contacts when balls are applied to the cam members 11.

In a case where the balls are applied to the cam members 11, if the material strength of the cam members 11 is higher than that of the cam faces 3, 7, stress concentrates on the contact points between the cam faces 3, 7 and the cam members 11, and therefore gives rise to a case where damage can occur on the cam faces 3, 7.

Therefore, in a case where the balls are applied to the cam members 11, in a case where connection power in the pilot clutch 163 in the clutch device 101 is raised to increase the travel stroke in the axial direction of the pressure ring 9, the material strength of the cam faces 3, 7 is required to be further increased. This leads to any design change and cost increase caused by the design change.

In addition, in a case where the material strength of the cam faces 3, 7 is increased, it gives rise to a case where contact pressure with the cam faces 3, 7 causes the cam members 11 to deform.

In contrast thereto, as the cam members 11 formed of the taper rollers reduce the contact pressure on the cam faces 3, 7, damages on the cam faces 3, 7, and deformation in the cam members 11, can be prevented even though the material strength of the cam members 11 is increased as compared with the cam faces 3, 7.

Therefore, in the clutch device 101, without changing the design and increasing cost by the design change, a connection force on the pilot clutch 163 can be increased so as to increase the travel stroke of the pressure ring 9 in the axial direction and other effects will be enjoyed, thereby improving the connection properties of the intermission section 107.

In the cam mechanism 1 as such, the cam members 11 are formed of the taper rollers, in each of which the radius of revolution becomes greater from the radially inner side to the radially outer side, and the cam faces 3, 7 of the cam ring 5 and the pressure ring 9 are so set as a slope as to make the central position of each cam member 11 at the radially inner side in the relative movement of each cam member 11 relative to the cam faces 3, 7 conform to the central position of each cam member 11 at the radially outer side.

Thereby, when the cam members 11 move in the circumferential direction between the cam faces 3, 7 of the cam ring 5 and the pressure ring 9, the difference between the travel distance at the radially inner side and the travel distance at the radially outer side is absorbed and the variations in the rotational axial center are prevented, and the radially outer sides of the cam members 11 are prevented from making slippage in moving on the cam faces 3, 7.

Therefore, in such a cam mechanism 1, the frictional resistance by the slippage of the cam members 11 on the cam faces 3, 7 and such are not required to be taken into consideration in designing axial motion of the pressure ring 9 and such. This leads to improvement in design precision.

Further, as the radially internal wall sections 13 that set a radially internal bound to the cam members 11 and the radially external wall sections 15 that set a radially external bound to the cam members 11 are formed on the cam ring 5 and the pressure ring 9, it is made possible to stably move the cam members 11 in the circumferential direction of the cam faces 3, 7, and stabilize the axial movement of the pressure ring 9.

Moreover, as the radially internal wall section 13 and the radially external wall section 15 have round-about shapes for simultaneously limiting the plurality of cam members 11, movement of the plurality of cam members 11 in the circumferential direction of all the cam faces 3, 7 can be stably carried out, and axial movement of the pressure ring 9 can be stabilized.

Further, as the inner end peripheral wall 17 and the outer end peripheral wall 19 of each cam member 11 are formed as the curved faces 20, 22, the cam members 11 can smoothly move on the cam faces 3, 7 along the curved faces of the inner end peripheral wall 17 and the outer end peripheral wall 19.

Moreover, as the cam members 11 are formed of a material of higher strength than the cam faces 3, 7, deformation of the cam members 11 can be prevented and the cam mechanism 1 can exert great cam thrust force.

Further, as the clutch device 101 with the cam mechanism 1 enables improvement of precision in the design of the cam mechanism 1, it is possible to carry out more reasonable designing according to the characteristics of the intermission section 107 and improve the properties of the intermission of the intermission section 107.

While some modification will occur in the aforementioned embodiment, modifications as shown in FIGS. 9-14 for example may be possible.

In a cam mechanism 201 according to the present embodiment, an outer end face 203 of each cam member 11 includes a convex section projecting radially outward and the convex section is a proper curved face, such as a spherical face for example. A radius of curvature R1 of this curved face is set to be smaller than a radius of curvature R2 of an internal peripheral face 205 of a radially external wall section 15.

Figure 10:
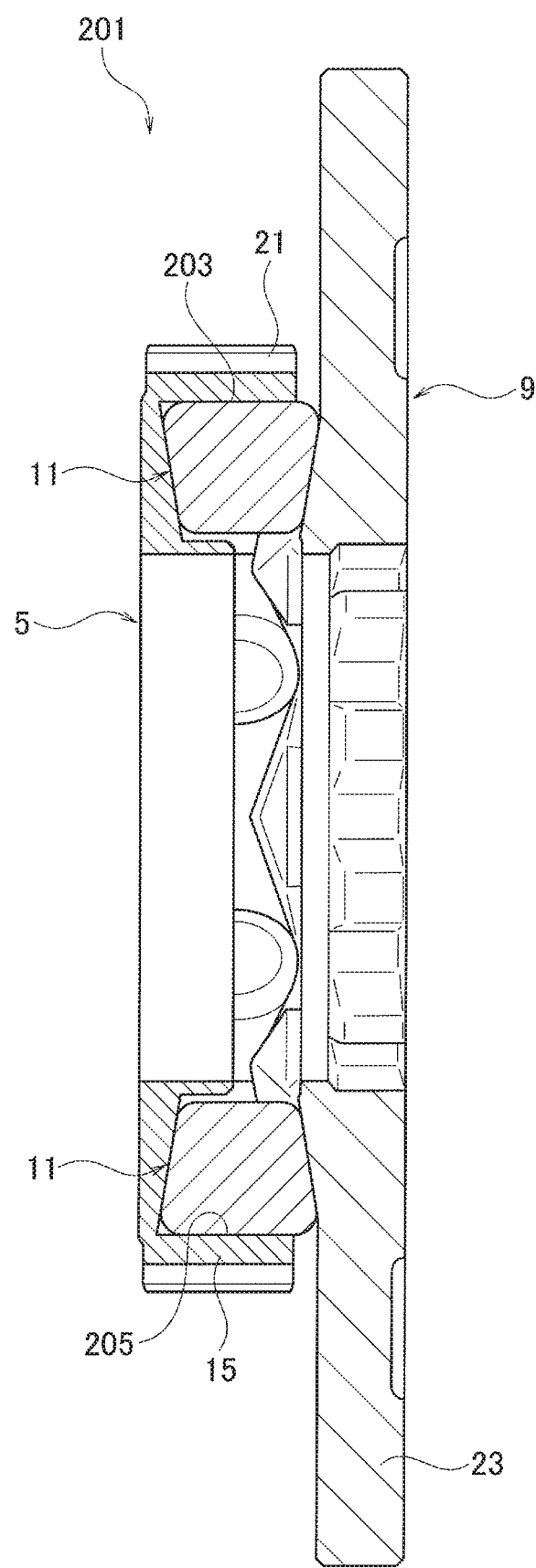
FIG. 10 is a sectional view of the cam mechanism of the second embodiment.
Figure 14:
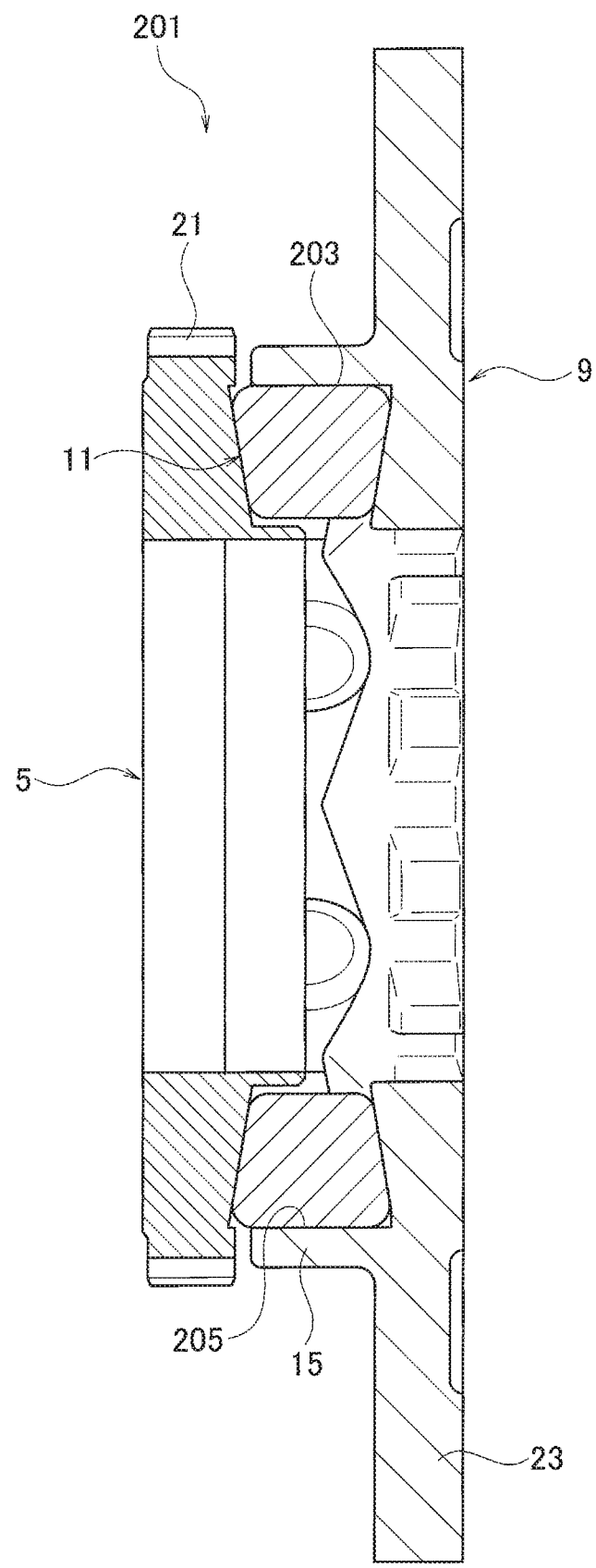
FIG. 14 is a sectional view showing another example of the cam mechanism of the second embodiment.

As exemplarily shown in FIGS. 10, 14, the radially external wall section 15 may be provided on either the cam ring 5 or the pressure ring 9.

Further, each cam face 3, 7 of the cam ring 5 and the pressure ring 9 has a first cam face 207 where each cam member 11 relatively moves from an initial position to a first operational position and a second cam face 209 where each cam member 11 relatively moves from the first operational position to a second operational position, and the first cam face 207 is set to have greater sloping angle than the second cam face 209.

Meanwhile, identical reference signs will be attached to constitutions identical to the first embodiment and explanation of its constitution and function will refer to the first embodiment and therefore are omitted in this embodiment but create the same effects because the constitutions are identical to the first embodiment.

Here, on each cam member 11 shown in FIGS. 1-8, when relatively moving in between the cam faces 3, 7 of the cam ring 5 and the pressure ring 9, external force acts so that the side of the outer end face 203 (see FIG. 12) moves radially outwardly.

The outer end face 203 of each cam member 11 would, thereby, slip on the radially external wall sections 15, 15 provided on the cam ring 5 and the pressure ring 9.

Then, in a case where the outer end face 203 is formed as a flat or in a shape similar to a flat, as the radially external wall section 15 is formed in the round-about shape, namely in a cylindrical shape, it has at least two contact points on the internal peripheral face 205 (see FIG. 13) of the radially external wall section 15.

In addition, as the radially external wall sections 15 are respectively provided on both the cam ring 5 and the pressure ring 9, the outer end face 203 and the internal peripheral faces 205 of the radially external wall sections 15 have at least four contact points.

If the outer end face 203 of each cam member 11 and the internal peripheral faces 205 of the radially external wall sections 15 in the relative movement of each cam member 11 relative to the cam faces 3, 7 of the cam ring 5 and the pressure ring 9 have many contact points in this way, frictional resistance will increase.

Thus, as shown in FIGS. 9-14, the outer end face 203 of each taper roller in each cam member 11 includes the convex section projecting radially outward and the convex section is a proper curved face, such as a spherical face for example. The radius of curvature R1 of the outer end face 203 of the taper roller is set to be smaller than the radius of curvature R2 of the internal peripheral face 205 of the radially external wall section 15.

The outer end face 203 of each taper roller, as it projects radially outwardly and its radius of curvature R1 is smaller than the radius of curvature R2 of the internal peripheral face 205, has a point contact on, and slides on, the internal peripheral face 205 of the radially external wall section 15.

Figure 12:
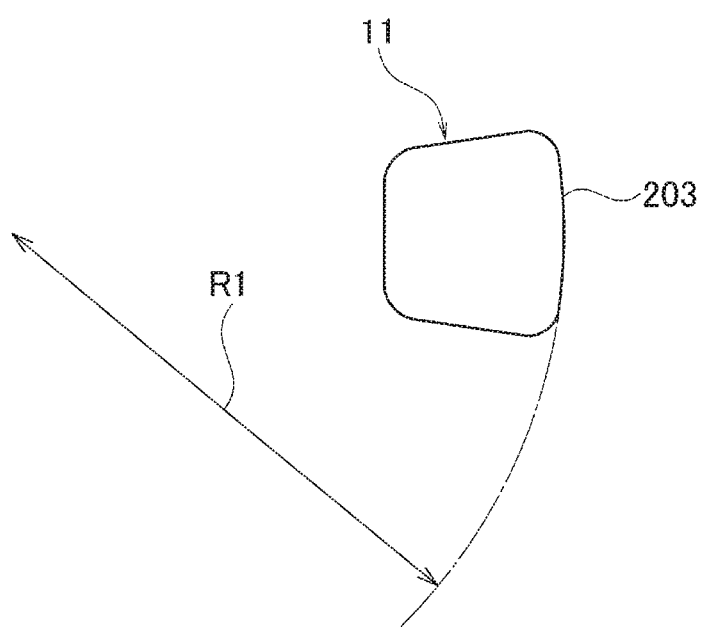
FIG. 12 is a side view of a cam member of the cam mechanism of the second embodiment.

Here, the radius of curvature R1 of the outer end face 203 of the taper roller is defined to have a meaning consistent with that based on general technical knowledge, and is thus, as being understood with reference to FIG. 12, defined to be a radius of a curved face of the outer end face 203.

Figure 11:
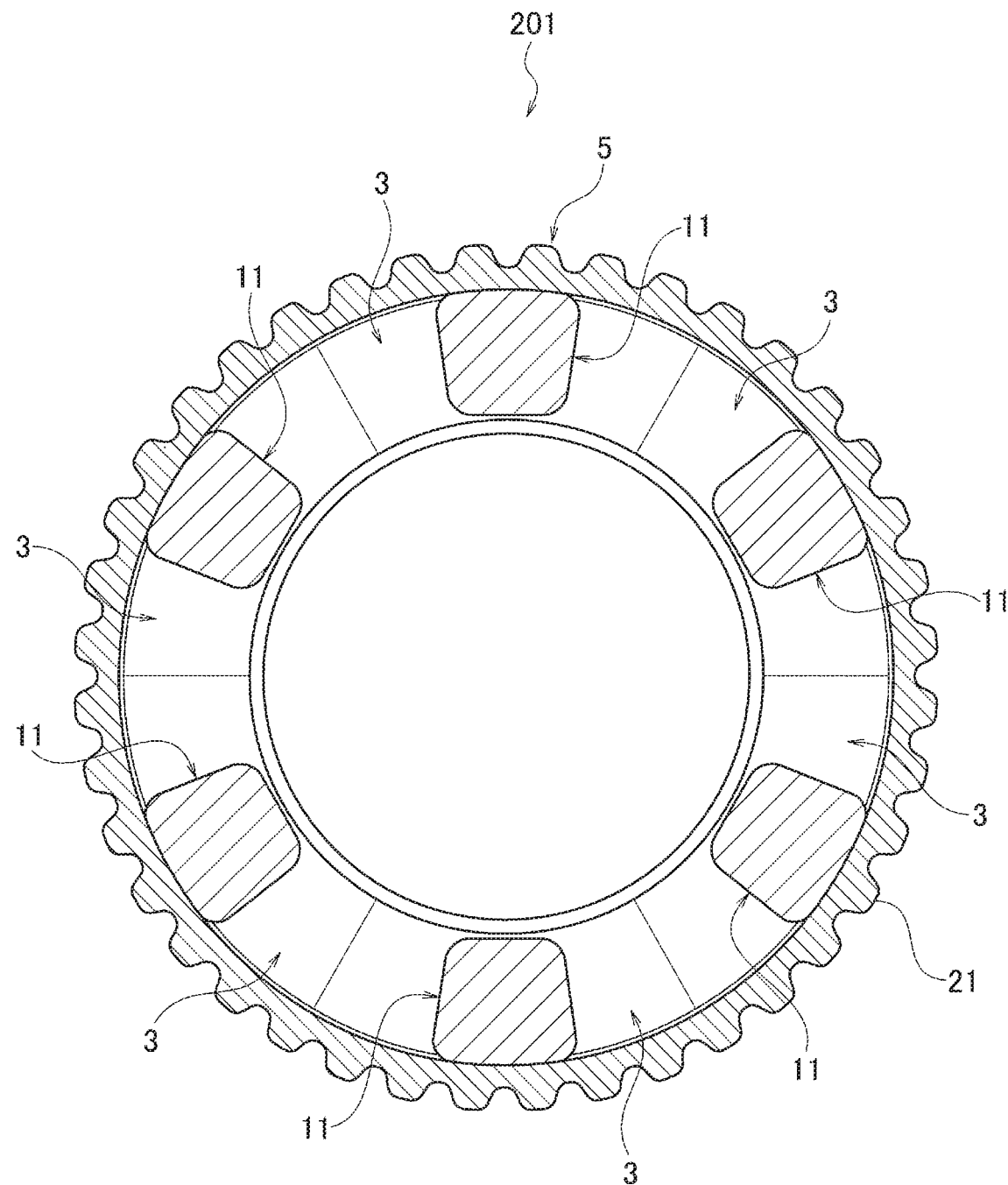
FIG. 11 is a sectional view of the cam mechanism of the second embodiment.
Figure 13:
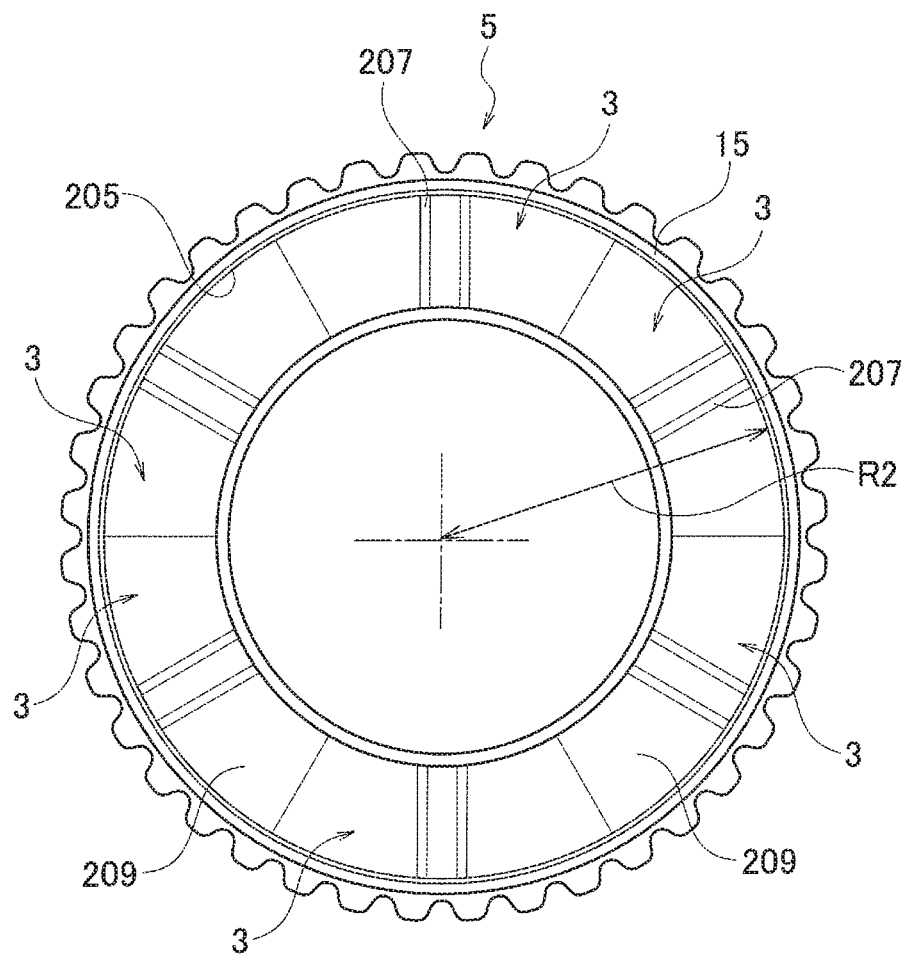
FIG. 13 is an elevational view of a cam ring of the cam mechanism of the second embodiment.

Referring to FIGS. 11, 13 in combination with FIG. 12, as the radius of curvature R1 of the outer end face 203 is made smaller than the radius of curvature R2 of the inner peripheral face 205 of the radially external wall section 15, when the cam members 11 relatively move between the cam faces 3, 7 of the cam ring 5 and the pressure ring 9, the number of contact points between the outer end face 203 and the inner peripheral face 205 of the radially external wall section 15 can be limited to be one or, in a case where the radially external wall sections 15 are respectively provided on the cam ring 5 and the pressure ring 9, the number of the contacts points between the outer end face 203 and the inner peripheral faces 205 of the radially external wall sections 15 can be limited to be two.

Therefore, the frictional resistance between the outer end faces 203 of the cam members 11 and the inner peripheral faces 205 of the radially external wall sections can be reduced and influence on design of the cam mechanism 201 can be suppressed.

Here, the radially external wall section 15 is, as shown in FIG. 10 and FIG. 14, provided only on the cam ring 5, or only on the pressure ring 9. Meanwhile, the radially internal wall section 13 is also provided only on either the cam ring 5 or the pressure ring 9.

As the radially external wall section 15 is provided only on one of the cam ring 5 and the pressure ring 9, in this way, the number of the contact points between the outer end face 203 of each cam member 11 and the internal peripheral face 205 of the radially external wall section 15 can be made to be one and the frictional resistance can be as well reduced.

On the other hand, the cam faces 3, 7 of the cam ring 5 and the pressure ring 9 are provided with the first cam faces 207 and the second cam faces 209.

Each first cam face 207 is provided in the range from the trough section of the cam faces 3, 7 on which each cam member 11 rests in the initial position to the first operational position where each cam member 11 relatively moves to some degree from the initial position between the cam faces 3, 7 of the cam ring 5 and the pressure ring 9. Specifically, the first cam face 207 continuously slopes from the trough section and the trough section rests the cam member 11 on the initial position, but the cam member 11, when rolling on the first cam face 207, axially moves the first operational position.

Specifically, based on the first cam face 207, as being different from the second cam face 209, the axial stroke of the pressure ring 9 relative to the revolution phase of the cam ring 5 and the pressure ring 9 can be made larger.

The second cam face 209 is provided in the range from the first operational position to the second operational position as a top of the peak of the cam faces 3, 7, where each cam member 11 finishes relative movement from the first operational position between the cam faces 3, 7 of the cam ring 5 and the pressure ring 9. Specifically, the second cam face 209 continuously slopes from the first cam face 207 and the cam member 11, when rolling on the second cam face 209, axially moves to the second operational position.

Specifically, based on the second cam face 209 as compared with the first cam face 207, the revolution phase of the cam ring 5 and the pressure ring 9 is made larger, and the ratio of displacement in the axial stroke corresponding thereto is made smaller, thereby increasing the thrust force by the pressure ring 9.

Such a first cam face 207 and such a second cam face 209 are so set that a tilt angle of the first cam face 207 is larger than a tilt angle of the second cam face 209.

By setting the tilt angles of the first cam face 207 and the second cam face 209 in this way, when the cam members 11 moves on the first cam faces 207, specifically when the cam members 11 moves from these initial positions to the first operational positions, a large axial travel distance of the pressure ring 9 can be obtained with a small rotation of the cam ring 5, so that the initial response of the pressure ring 9 can be improved.

In contrast, when the cam members 11 move on the second cam faces 209, specifically when the cam members 11 move from the first operational positions to the second operational positions, by axially moving the pressure ring 9 with a large rotation of the cam ring 5 as compared with the case where the cam members 11 move on the first cam face 207, a connection force of the intermission section 107 (see FIG. 1) can be more properly controlled and the intermission properties of the intermission section 107 can be improved.

In the cam mechanism 201 as so structured, as the outer end face 203 of each taper roller in each cam member 11 is formed to be spherical and the radius of curvature R1 of the outer end face 203 of the taper roller is set to be smaller than the radius of curvature R2 of the inner peripheral face 205 of the radially external wall section 15, the number of the contact points between the outer end face 203 of each cam member 11 and the internal peripheral face 205 of the radially external wall section 15 in the relative movement of each cam member 11 between the cam faces 3, 7 of the cam ring 5 and the pressure ring 9 can be reduced and the frictional resistance can be reduced.

Further, as the radially external wall section 15 is provided only on one of the cam ring 5 and the pressure ring 9, the number of the contact points between the outer end face 203 of each cam member 11 and the internal peripheral face 205 of the radially external wall section 15 can be one and the frictional resistance can be as well reduced.

Moreover, as the tilt angle of the first cam face 207 is set to be larger than that of the second cam face 209, the response of the cam members 11 from the initial positions by the first cam faces 207 can be improved and the axial movement of the pressure ring 9 by the second cam face 209 can be more properly controlled.

Meanwhile, in the cam mechanism as described above, the radially internal wall section and the radially external wall section are provided on the cam ring and the pressure ring, but, as not being limited thereto, the radially internal wall section and the radially external wall section may be provided on one of the cam ring and the pressure ring.

Further, in the taper roller in the cam member, the inner end peripheral wall and the outer end peripheral wall are formed to be curved faces, but, as not being limited thereto, one of the inner end peripheral wall and the outer end peripheral wall may be formed to be a curved face.

Further, if the radially external wall section 15 is provided only on one of the cam ring 5 and the pressure ring 9, it is possible to limit the number of the contact points between the outer end face 203 of each cam member 11 and the inner peripheral face 205 of the radially external wall section 15 to one, but, without forming the outer end face 203 of each cam member 11 to be the spherical face of the radius of curvature R1, any convex section (including a projection) may be provided around the axial center of the outer end face 203 of each cam member 11 to have contact/slippage on the radially external wall section. Also in this case, to prevent the tip end of the convex section or the edge of the tip end from hemi-contact on the radially external wall section, they may be chamfered or beveled.

Moreover, in the aforementioned clutch device, while the electromagnetic actuator is applied to the actuator, it is not limiting and any actuator such as a motor-gear-cam mechanism for example may be applied thereto as long as it is an actuator for generating relative rotation between the cam ring and the pressure ring.

Although certain exemplary embodiments are described above, modifications and variations of the embodiments will occur to those skilled in the art, in light of the above teachings.

The invention claimed is:

1. A cam mechanism comprising:
    a cam ring forming a circle around an axis and including a plurality of cam ring cam faces arranged circumferentially on a face of the circle facing in an axial direction, each of the cam faces sloping in a circumferential direction relative to a circumferential face perpendicular to the axis;
    a pressure ring adjacent axially to the face of the cam ring and including a plurality of pressure ring cam faces opposed to the face of the cam ring and respectively symmetrical to the plurality of cam ring cam faces, the pressure ring being rotatable relatively to the cam ring about the axis; and
    a plurality of taper rollers interposed between the cam ring and the pressure ring, each of the taper rollers including a conical face tapering radially inwardly and capable of rolling on the cam ring and pressure ring cam faces;
    wherein each of the plurality of taper rollers is so dimensioned that generatrices of the conical face converge on the axis, and each of the cam ring cam faces and each of the pressure ring cam faces are helicoids inclined radially outwardly to get in line contact with the conical face; and
    wherein each of the cam faces of the cam ring and the pressure ring includes a trough section to make the taper roller rest on an initial position, a first cam face continuously sloping to the trough section so as to axially move the taper roller from the initial position to a first position, and a second cam face continuously sloping to the first cam face so as to axially move the taper roller from the first position to a second position, the second cam face forming a smaller angle with the circumferential face than does the first cam face.

2. The cam mechanism of claim 1, further comprising:
a radially internal wall section setting a radially internal bound to the plurality of taper rollers, or a radially external wall section setting a radially external bound to the plurality of taper rollers.

3. The cam mechanism of claim 2, wherein one or both of the internal wall section and the external wall section is circumferentially continuous.

4. The cam mechanism of claim 3, wherein each of the taper rollers includes an outer end face including a convexity projecting radially outwardly so as to have a point contact with, and slide on, an internal periphery of the radially external wall section.

5. The cam mechanism of claim 4, wherein the convexity is a spherical face and a radius of curvature of the convexity is smaller than a radius of the internal periphery of the radially external wall section.

6. The cam mechanism of claim 4, wherein the radially external wall section forms a unitary body with any one of the cam ring and the pressure ring.

7. The cam mechanism of claim 1, wherein each of the taper rollers includes an inner end face or an outer end face formed of a curved face.

8. A clutch device comprising:
a first rotary member and a second rotary member respectively and independently rotatable about the axis;
a cam mechanism comprising
a cam ring forming a circle around an axis and including a plurality of cam ring cam faces arranged circumferentially on a face of the circle facing in an axial direction, each of the cam faces sloping in a circumferential direction relative to a circumferential face perpendicular to the axis,
a pressure ring adjacent axially to the face of the cam ring and including a plurality of pressure ring cam faces opposed to the face of the cam ring and respectively symmetrical to the plurality of cam ring cam faces, the pressure ring being rotatable relatively to the cam ring about the axis, and
a plurality of taper rollers interposed between the cam ring and the pressure ring, each of the taper rollers including a conical face tapering radially inwardly and capable of rolling on the cam ring and pressure ring cam faces,
an actuator drivingly coupled with the cam ring to rotate the cam ring; and
a clutch adjacent to the pressure ring and receiving pressure force from the pressure ring to disconnectably connect so as to transmit torque between the first rotary member and the second rotary member;
wherein each of the plurality of taper rollers is so dimensioned that generatrices of the conical face converge on the axis, and each of the cam ring cam faces and each of the pressure ring cam faces are helicoids inclined radially outwardly to get in line contact with the conical face; and
wherein each of the cam faces of the cam ring and the pressure ring includes a trough section to make the taper roller rest on an initial position, a first cam face continuously sloping to the trough section so as to axially move the taper roller from the initial position to a first position, and a second cam face continuously sloping to the first cam face so as to axially move the taper roller from the first position to a second position, the second cam face forming a smaller angle with the circumferential face than does the first cam face.

* * * * *